(12) United States Patent
Kathol et al.

(10) Patent No.: US 8,444,183 B2
(45) Date of Patent: May 21, 2013

(54) BARRIER SEAL AND ASSEMBLY INCORPORATING SAME

(75) Inventors: Nathan Kathol, Chestermere (CA); Vi (Jim) Nguy, Calgary (CA); Constantin Vasile Popilian, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 96 days.

(21) Appl. No.: 13/131,573

(22) PCT Filed: Jan. 19, 2010

(86) PCT No.: PCT/IB2010/050241
§ 371 (c)(1),
(2), (4) Date: May 26, 2011

(87) PCT Pub. No.: WO2010/082186
PCT Pub. Date: Jul. 22, 2010

(65) Prior Publication Data
US 2011/0260451 A1    Oct. 27, 2011

(30) Foreign Application Priority Data

Jan. 19, 2009 (CA) ...................... 2650168

(51) Int. Cl.
*F16L 19/00* (2006.01)
(52) U.S. Cl.
USPC ..................... 285/123.2; 285/365
(58) Field of Classification Search
USPC ................. 285/123.2, 123.6, 123.12, 124.4, 285/124.2, 124.3, 365, 366, 367, 368
See application file for complete search history.

(56) References Cited

U.S. PATENT DOCUMENTS

| | | | | |
|---|---|---|---|---|
| 2,031,849 A * | 2/1936 | O'Leary | ...................... | 285/123.4 |
| 2,083,090 A * | 6/1937 | Rector | ...................... | 285/123.12 |
| 2,144,227 A * | 1/1939 | Penick et al. | ............... | 285/123.6 |
| 2,794,505 A * | 6/1957 | Allen | ........................ | 285/123.2 |
| 2,939,727 A * | 6/1960 | Allen et al. | ................ | 285/123.2 |
| 3,071,396 A * | 1/1963 | Neilon | ........................ | 285/123.2 |
| 3,072,420 A * | 1/1963 | Lebeaux et al. | ........... | 285/123.2 |
| 3,080,181 A * | 3/1963 | Watts et al. | ................ | 285/123.2 |
| 3,118,690 A * | 1/1964 | Watts et al. | ................ | 285/123.2 |
| 3,141,685 A * | 7/1964 | Watts | ............................ | 285/367 |
| 3,177,013 A * | 4/1965 | Rector | ........................ | 285/123.2 |
| 3,330,355 A * | 7/1967 | Yancey | ...................... | 285/123.2 |
| 3,503,634 A * | 3/1970 | Cadiou | ...................... | 285/124.3 |
| 3,680,632 A * | 8/1972 | Myers | ........................ | 285/123.2 |
| 3,873,134 A * | 3/1975 | Sammaritano | ............ | 285/123.2 |
| 3,948,315 A * | 4/1976 | Powell | ........................ | 285/124.2 |
| 4,570,701 A * | 2/1986 | Roberts | ...................... | 285/124.2 |
| 3,325,176 A | 6/1987 | Latham | | |
| 5,135,265 A * | 8/1992 | Bouscher et al. | ......... | 285/123.2 |
| RE34,332 E * | 8/1993 | Adams et al. | .............. | 285/123.2 |
| 5,466,018 A * | 11/1995 | Stobbart | ..................... | 285/363 |
| 8,033,579 B2 * | 10/2011 | Takeda et al. | ................ | 285/367 |
| 8,191,933 B2 * | 6/2012 | Rao et al. | ...................... | 285/368 |

* cited by examiner

*Primary Examiner* — David E Bochna
(74) *Attorney, Agent, or Firm* — Daren C. Davis; Wayne I. Kanak

(57) ABSTRACT

A barrier seal includes a bulkhead having a first end, a second end and a surface extending between the first end and the second end. The barrier seal further includes a rib extending radially outwardly from the surface of the bulkhead. The rib defines a first sealing profile extending from a first side of the rib and a second sealing profile extending from a second side of the rib.

7 Claims, 5 Drawing Sheets

BARRIER SEAL AND ASSEMBLY INCORPORATING SAME

BACKGROUND OF THE INVENTION

1. Field of the Invention

The present invention relates to a barrier seal and an assembly incorporating the barrier seal.

2. Description of Related Art

Efficient oilfield production operations rely upon information concerning the production intervals of wells. Such information is especially important in oilfield production from horizontal wells, where the thickness and geology of the oil-bearing reservoir can vary greatly over the length of the horizontal section. An instrumentation string leading from one or more downhole sensors is employed to gather pressure, temperature, and other profiles of a well. An instrumentation string is typically deployed inside the casing of the well in direct contact with the wellbore fluids. Due to safety and regulatory issues, controls must be placed on instrumentation strings to inhibit the migration of wellbore fluids to the surface.

Such instrumentation strings are typically connected to data acquisition systems at the surface so that temperature, pressure, and other data can be collected, stored, and/or transmitted. There is, therefore, a need to access the instrumentation string at the wellhead and such access is typically accomplished by allowing the instrumentation string to exit the wellhead through a secondary port, such as an instrumentation string wellhead outlet. Such outlets are the final barrier that isolates wellbore fluids from the surface.

A major issue of well control for the instrumentation string is the assembly of the instrumentation string wellhead outlet to the wellhead. Connecting and sealing the various lines in the instrumentation string to the wellhead outlet and connecting the lines to the surface data acquisition system is typically time consuming and painstaking, due to the delicate nature and size of the lines. The size and restricted volume of the instrumentation string wellhead outlet can also hinder the task of sealing and connecting the lines. The more the lines are handled, the greater the chance one or more of the lines may be damaged due to their fragile nature. It is, therefore, desirable to reduce the time required to assemble the instrumentation wellhead outlet and, thus, reduce line handling.

There are many ways to inhibit wellbore fluids from reaching the surface well known in the art, however, considerable shortcomings remain.

BRIEF SUMMARY OF THE INVENTION

In one aspect, the present invention provides a barrier seal. The barrier seal includes a bulkhead having a first end, a second end, and a surface extending between the first end and the second end. The barrier seal further includes a rib extending radially outwardly from the surface of the bulkhead. The rib defines a first sealing profile extending from a first side of the rib and a second sealing profile extending from a second side of the rib.

In another aspect, the present invention provides an assembly. The assembly includes a first member defining a sealing profile, a second member defining a sealing profile, and a barrier seal disposed between the first member and the second member. The barrier seal includes a bulkhead having a first end, a second end, and a surface extending between the first end and the second end, and a rib extending radially outwardly from the surface of the bulkhead. The rib defines a first sealing profile extending from a first side of the rib and a second sealing profile extending from a second side of the rib. The assembly further includes a clamp engaged with the first member and the second member for deflecting the first sealing profile into a sealing engagement with the sealing profile of the first member and for deflecting the second sealing profile into a sealing engagement with the sealing profile of the second member.

In yet another aspect, the present invention provides a wellhead including an instrumentation string outlet. The instrumentation string outlet includes a first hub defining a sealing profile, a second hub defining a sealing profile, and a barrier seal disposed between the first hub and the second hub. The barrier seal includes a bulkhead having a first end, a second end, and a surface extending between the first end and the second end, and a rib extending radially outwardly from the surface of the bulkhead, the rib defining a first sealing profile extending from a first side of the rib and a second sealing profile extending from a second side of the rib. The instrumentation string outlet further includes a clamp engaged with the first hub and the second hub for deflecting the first sealing profile into a sealing engagement with the sealing profile of the first hub and for deflecting the second sealing profile into a sealing engagement with the sealing profile of the second hub.

The present invention provides significant advantages, including: (1) providing a barrier seal that inhibits the flow of fluids therethrough; (2) providing a means to more efficiently assemble wellheads and, in particular, instrumentation string outlets; and (3) providing an instrumentation string outlet that can be assembled with less handling of the instrumentation string.

Additional objectives, features, and advantages will be apparent in the written description which follows.

BRIEF DESCRIPTION OF THE DRAWINGS

The novel features characteristic of the invention are set forth in the appended claims. However, the invention itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
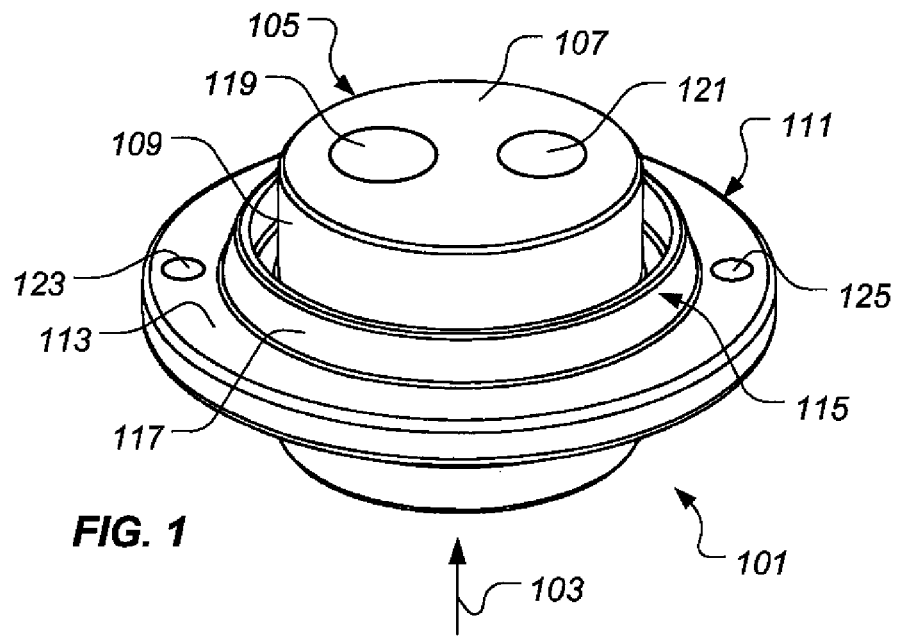
FIG. 1 is a perspective view of an illustrative embodiment of a barrier seal.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF THE INVENTION

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a barrier seal and an assembly incorporating the barrier seal. The barrier seal comprises a bulkhead having a first end, a second end, and a surface extending between the first end and the second end. A rib extends radially outwardly from the surface of the bulkhead. The rib defines a first sealing profile on a first side of the rib and a second sealing profile on a second side of the rib. The assembly incorporating the barrier seal comprises a first member defining a sealing profile, a second member defining a sealing profile, a barrier seal disposed between the first member and the second member, and a clamp. The barrier seal comprises a bulkhead having a first end, a second end, and a surface extending between the first end and the second end. A rib extends radially outwardly from the surface of the bulkhead. The rib defines a first sealing profile on a first side of the rib and a second sealing profile of the second side of the rib. The clamp is engaged with the first member and the second member for deflecting the first sealing profile into a sealing engagement with the sealing profile of the first member and for deflecting the second sealing profile into a sealing engagement with the sealing profile of the second member. In one embodiment, the assembly is a wellhead including an instrumentation string outlet.

Figure 2:
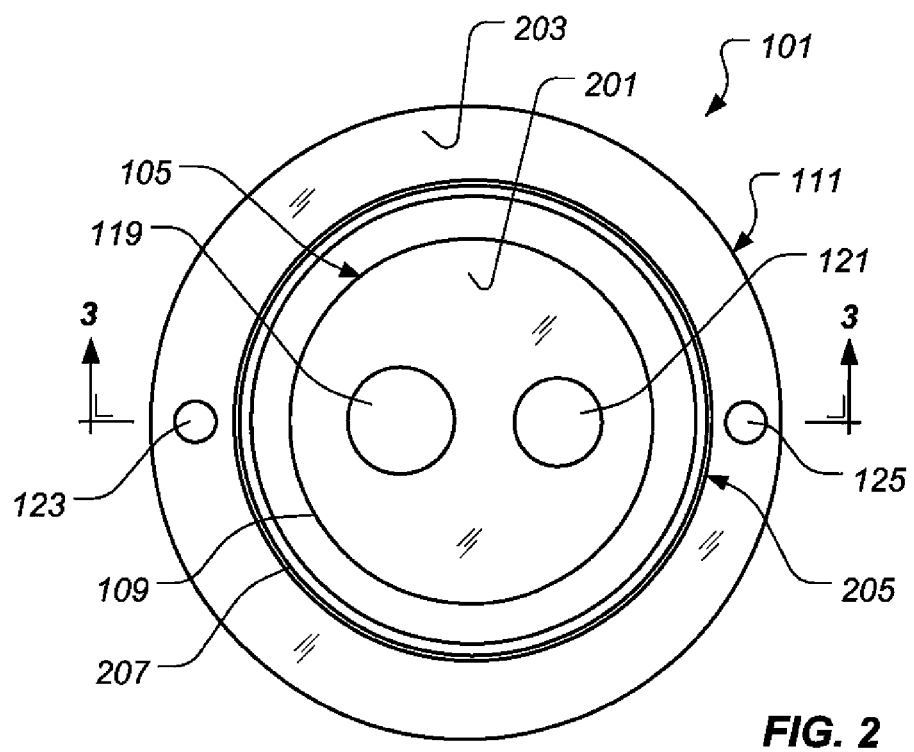
FIG. 2 is a bottom, plan view of the barrier seal of FIG. 1.
Figure 3:
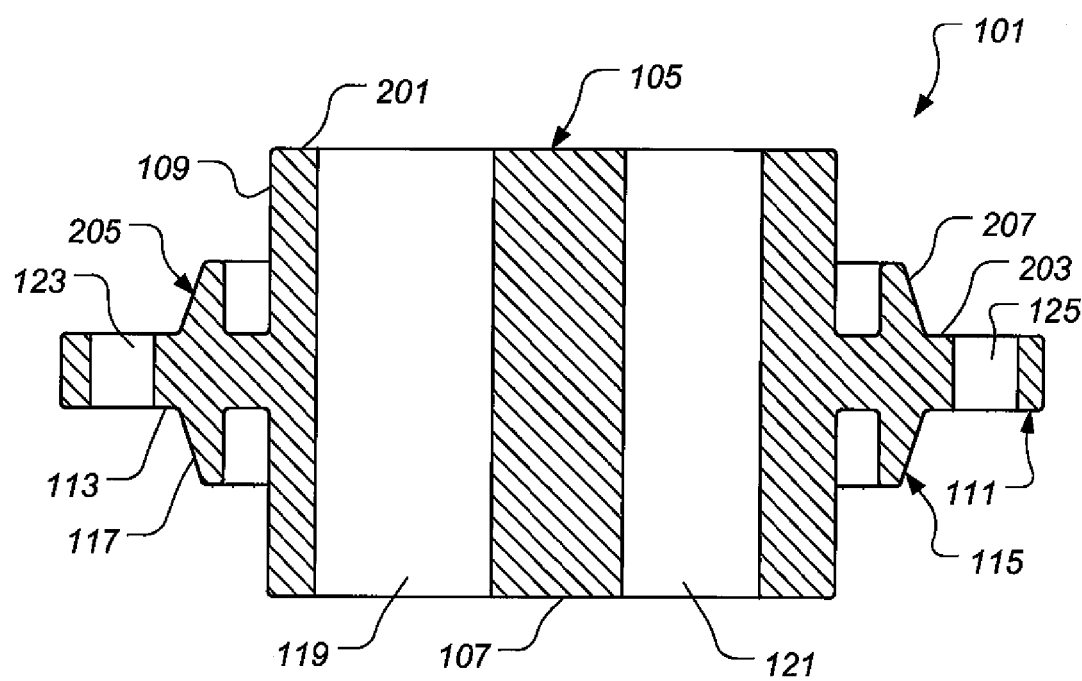
FIG. 3 is a cross-sectional view of the barrier seal of FIG. 1, taken along the line 3-3 in FIG. 2.

FIGS. 1-3 provide views of an illustrative embodiment of a barrier seal 101. FIG. 1 is a perspective view of barrier seal 101. FIG. 2 is a bottom, plan view of barrier seal 101. Note that FIG. 2 depicts barrier seal 101 when viewed generally in a direction corresponding to an arrow 103 in FIG. 1. FIG. 3 is a cross-sectional view of barrier seal 101, taken along the line 3-3 in FIG. 2. Barrier seal 101 comprises a bulkhead 105 having a first end 107, a second end 201 (shown in FIGS. 2 and 3), and a surface 109 extending between first end 107 and second end 201. A rib 111 extends radially outwardly from surface 109 of bulkhead 105. Rib 111 defines a first side 113 and a second side 203 (shown in FIGS. 2 and 3). Rib 111 includes a first lip 115 extending from first side 113 of rib 111 and a second lip 205 (shown in FIGS. 2 and 3) extending from second side 203 of rib 111. First lip 115 defines a first sealing profile 117 and second lip 205 defines a second sealing profile 207, which is best shown in FIG. 3. Thus, rib 111 defines a first sealing profile 117 extending from first side 113 thereof and a second sealing profile 207 extending from second side 203 thereof. First sealing profile 117 and second sealing profile 207 interface with sealing profiles of adjacent members to sealingly join the adjacent members, as is discussed in greater detail herein.

Still referring to FIGS. 1-3, bulkhead 105 preferably defines at least one passageway, such as passageways 119 and 121, extending between first end 107 and second end 201 (shown in FIGS. 2 and 3) of bulkhead 105. Passageways 119, 121, and the like allow lines, such as instrumentation lines, control lines, or the like, to extend through barrier seal 101, as is discussed in greater detail herein. Such instrumentation and/or control lines may be electrical, optical, pneumatic, or hydraulic lines, or the like. Passageways 119, 121, and the like are preferably fitted with fittings that inhibit fluids from passing thorough passageways 119, 121, and the like while allowing lines to extend therethrough, as is discussed in greater detail herein. While bulkhead 105 defines at least one passageway in the illustrated embodiment, the scope of the present invention is not so limited. Rather, in some embodiments, bulkhead 105 may omit such passageways or include other features. Such embodiments are contemplated by the present invention.

Figure 4:
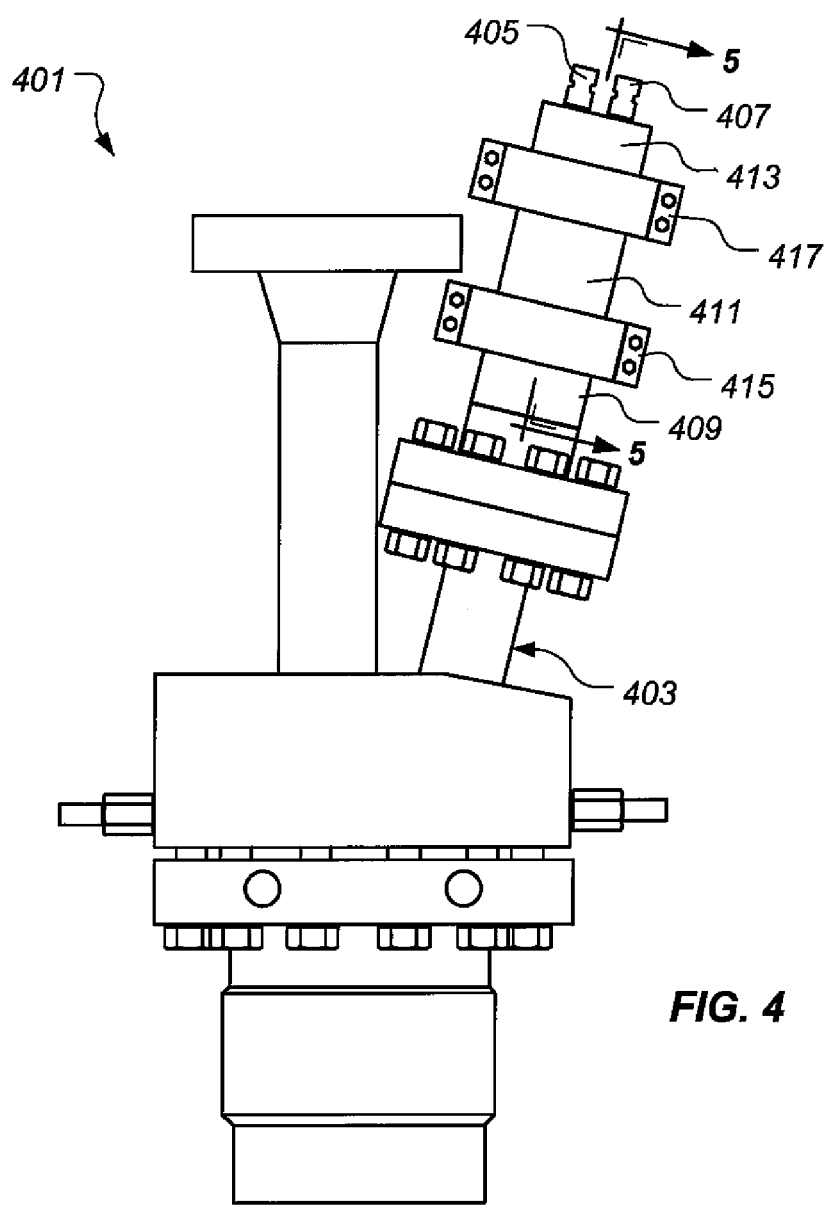
FIG. 4 is a side, elevational view of an illustrative embodiment of a wellhead including an instrumentation string outlet.

FIG. 4 depicts a side, elevational view of an illustrative embodiment of an assembly incorporating one or more barrier seals 101. In the illustrated embodiment, the assembly is a wellhead 401. Wellhead 401 comprises an instrumentation string outlet 403 in which barrier seals 101 are incorporated. Instrumentation string outlet 403 isolates wellbore fluids from reaching the surface therethrough while allowing instrumentation lines to extend from wellhead 401 through ports 405 and 407. Instrumentation string outlet 403 comprises a first hub 409, a second hub 411, and a third hub 413. Second hub 411 is attached to first hub 409 by a first clamp 415. Third hub 413 is attached to second hub 411 by a second clamp 417.

Figure 5:
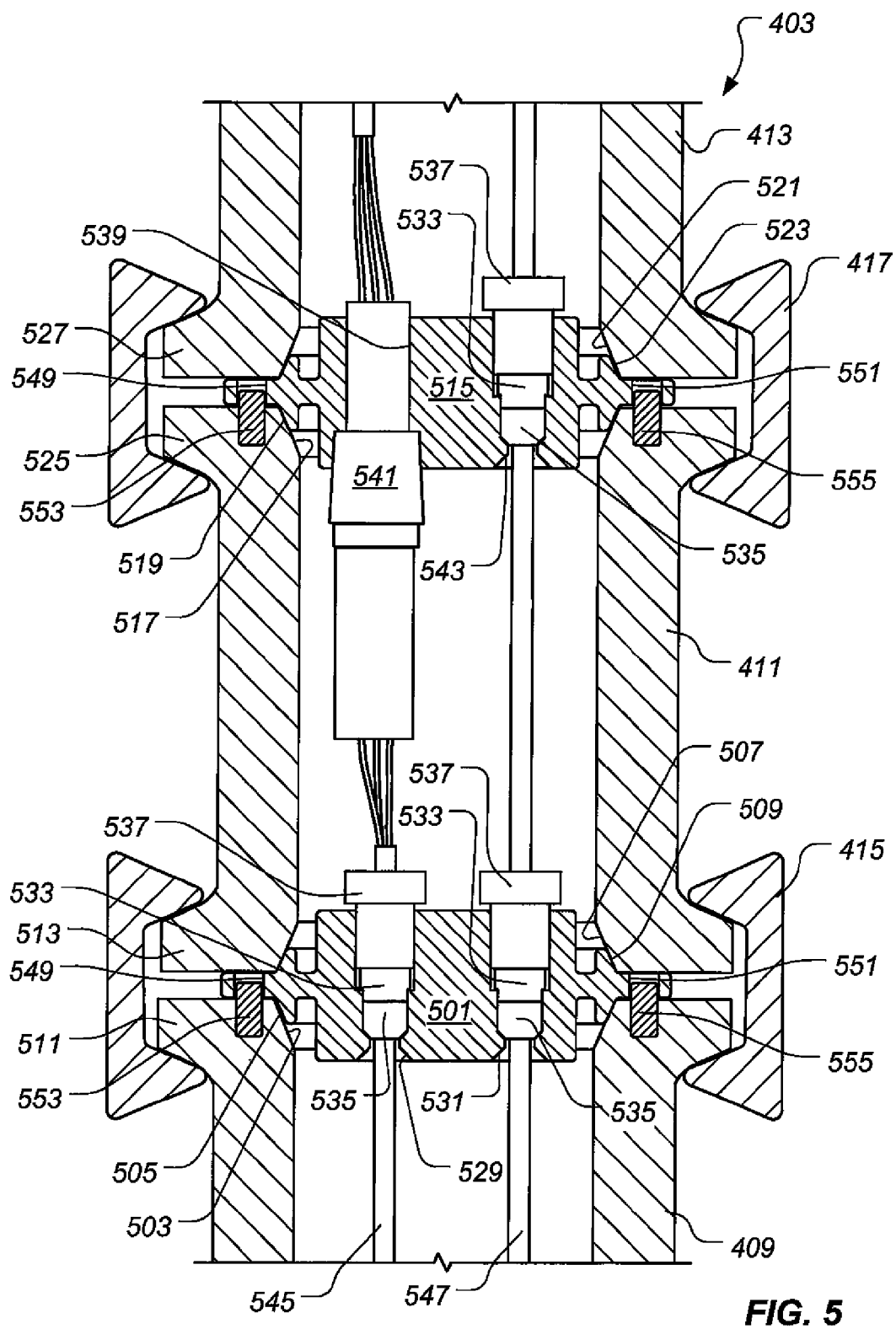
FIG. 5 is a partial cross-sectional view of a portion of the instrumentation string outlet of FIG. 4, taken along the line 5-5 in FIG. 4.

FIG. 5 depicts a partial cross-sectional view of an illustrative embodiment of a portion of instrumentation string outlet 403, taken along the line 5-5 in FIG. 4. In the illustrated embodiment, a first barrier seal 501 is disposed between first hub 409 and second hub 411. First barrier seal 501 corresponds to barrier seal 101 (shown in FIGS. 1-3) except that the configurations of the passageways that allow lines to extend therethrough are different from passageways 119 and 121 of barrier seal 101, as is discussed in greater detail herein. First hub 409 defines a sealing profile 503 that interfaces with a first sealing profile 505 of first barrier seal 501. Second hub 411 defines a first sealing profile 507 that interfaces with a second sealing profile 509 of first barrier seal 501. First hub 409 defines a flange 511 and second hub 411 defines a first flange 513. First clamp 415 is operatively associated with flanges 511 and 513 to urge flanges 511 and 513 toward one another, thus deflecting first sealing profile 505 and second sealing profile 509 of first barrier seal 501 generally radially inwardly and sealingly engaging first sealing profile 505 with sealing profile 503 of first hub 409 and sealingly engaging second sealing profile 509 with first sealing profile 507 of second hub 411. Any pressure within first hub 409 or second hub 411 urges first sealing profile 505 and second sealing profile 509 of first barrier seal 501 generally radially outwardly, thus enhancing the sealing engagement between first barrier seal 501 and first hub 409 and between first barrier seal 501 and second hub 411.

Similarly, a second barrier seal 515 is disposed between second hub 411 and third hub 413. Second barrier seal 515 corresponds to barrier seal 101 (shown in FIGS. 1-3) except that the configurations of the passageways that allow lines to extend therethrough are different from passageways 119 and 121 of barrier seal 101, as is discussed in greater detail herein. Second hub 411 defines a second sealing profile 517 that interfaces with a first sealing profile 519 of second barrier seal 515. Third hub 413 defines a sealing profile 521 that interfaces with a second sealing profile 523 of second barrier seal 515. Second hub 411 defines a second flange 525 and third hub 413 defines a flange 527. Second clamp 417 is operatively associated with flanges 525 and 527 to urge flanges 525 and 527 toward one another, thus deflecting first sealing profile 519 and second sealing profile 523 of second barrier seal 515 generally radially inwardly and sealingly engaging first sealing profile 519 with second sealing profile 517 of second hub 411 and sealingly engaging second sealing profile 523 with sealing profile 521 of third hub 413. Any pressure within second hub 411 or third hub 413 urges first sealing profile 519 and second sealing profile 523 of second barrier seal 515 generally radially outwardly, thus enhancing the sealing engagement between second barrier seal 515 and second hub 411 and between second barrier seal 515 and third hub 413.

Figure 6:
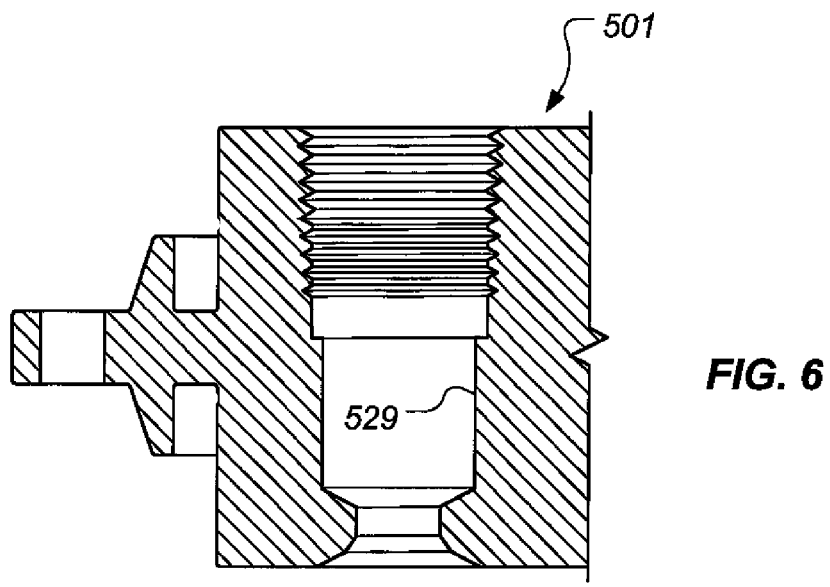
FIG. 6 is a cross-sectional view of a portion of an illustrative embodiment of a barrier seal depicting a first exemplary line passageway configuration.

As noted herein, first barrier seal 501 and second barrier seal 515 correspond to barrier seal 101 (shown in FIGS. 1-3) except for the configuration of passageways that allow lines to extend through first barrier seal 501 and second barrier seal 515. First barrier seal 501 defines passageways 529 and 531 that are configured to accept packing 533 and 535 and are configured to threadedly engage jam nuts 537. Note that packing 533 and 535, as well as jam nuts 537, are not shown in cross-section in FIG. 5 to improve clarity. The configuration of passageway 529, which also corresponds to the configuration of passageway 531, is shown in FIG. 6.

Figure 7:
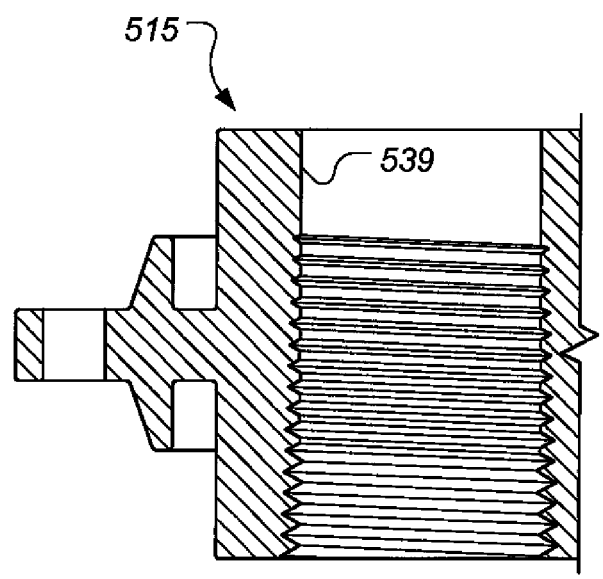
FIG. 7 is a cross-sectional view of a portion of an illustrative embodiment of a barrier seal depicting a second exemplary line passageway configuration.

Still referring to FIG. 5, second barrier seal 515 defines a passageway 539 that is configured to threadedly engage a connector 541. Second barrier seal 515 further defines a passageway 543 that is configured to accept packing 533 and 535 and is configured to threadedly engage jam nut 537. Note that connector 541, packing 533 and 535, as well as jam nut 537 are not shown in cross-section for clarity. The configuration of passageway 539 is shown in FIG. 7. The configuration of passageway 543 corresponds to the configuration of passageway 529, shown in FIG. 6.

It should be noted that the particular configurations of passageways 529, 531, 539, and 543 are merely exemplary of the wide variety of configurations contemplated by the present invention. Such passageways may be configured, for example, to operate with many different types of line sealing elements, such as ferrule and jam nut seals, packing and jam nut seals, connectors, or the like. Moreover, such passageways may be configured, for example, to have sealing threads, such as pipe threads, "Autoclave" threads, or the like.

A first line 545 and a second line 547 extend from downhole, through wellhead 401 (shown in FIG. 4) and through instrumentation string outlet 403. First line 545 extends through passageway 529 of first barrier seal 501, as well as through packing 535 and 533 and jam nut 537 operatively associated with first barrier seal 501. First line 545 further extends through passageway 539 and connector 541. Second line 547 extends through passageway 531 of first barrier seal 501, as well as through packing 535 and 533 and jam nut 537 operatively associated with first barrier seal 501. Second line 547 further extends through passageway 543 of second barrier seal 515, as well as through packing 535 and 533 and jam nut 537 operatively associated with second barrier seal 515.

The interfaces between packing 533 and 535 and first barrier seal 501, as well as the interfaces between packing 533 and 535 operatively associated with first barrier seal 501 and lines 545 and 547, inhibit the flow of fluids between first hub 409 and second hub 411. The interface between connector 541 and second barrier seal 515 and the interfaces between packing 533 and 535 operatively associated with second barrier seal 515 and second line 547 inhibit the flow of fluid between second hub 411 and third hub 413.

Still referring to FIG. 5, the illustrated embodiments of first barrier seal 501 and second barrier seal 515 define a plurality of alignment openings 549 and 551. Corresponding openings 123 and 125 are better shown in FIGS. 1-3. Alignment pins 553 and 555 extend from first hub 409 and are received in alignment openings 549 and 551, respectively, of first barrier seal 501 to align first barrier seal 501 on first hub 409. Alignment pins 553 and 555 also extend from second hub 411 and are received in alignment openings 549 and 551, respectively, of second barrier seal 515 to align second barrier seal 515 on second hub 411. Other means for aligning barrier seals on hubs or other such members are contemplated by the present invention. Moreover, the present invention contemplates barrier seals that omit alignment openings or other such alignment means.

It should be noted that the present invention contemplates any number of barrier seals, such as barrier seals 101, 501, 515, or the like, incorporated into an assembly.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications.

What is claimed is:

1. A wellhead including an instrumentation string outlet, the instrumentation string outlet comprising:
   a first hub defining a sealing profile;
   a second hub defining a sealing profile;
   a barrier seal disposed between the first hub and the second hub, the barrier seal comprising:
      a bulkhead having a first end, a second end, and a surface extending between the first end and the second end; and
      a rib extending radially outwardly from the surface of the bulkhead, the rib defining a first sealing profile extending from a first side of the rib and a second sealing profile extending from a second side of the rib, wherein the rib further defines a plurality of alignment openings; and
   a clamp engaged with the first hub and the second hub for deflecting the first sealing profile into sealing engagement with the sealing profile of the first hub and for deflecting the second sealing profile into sealing engagement with the sealing profile of the second hub.

2. The assembly of claim 1, wherein the rib comprises:
   a first lip defining the first sealing profile extending from the first side of the rib; and
   a second lip defining the second sealing profile extending from the second side of the rib.

3. The assembly of claim 1, wherein the bulkhead defines at least one passageway therethrough for passage of lines.

4. The assembly of claim 3, wherein the portion of the bulkhead defining the at least one passageway is at least in part threaded.

5. The assembly of claim 3, wherein the at least one passageway is configured to receive packing.

6. The assembly of claim 3, further comprising at least one line sealing element operably associated with the at least one passageway.

7. The assembly of claim 1, further comprising a plurality of alignment pins received in the alignment openings and the first hub.

\* \* \* \* \*